United States Patent [19]

Molnar

[11] 4,399,588
[45] Aug. 23, 1983

[54] AUTOMATIC FISH FEEDER AND ORIENTATOR

[75] Inventor: Robert Molnar, Windsor, Canada

[73] Assignee: Simnar, Inc., Windsor, Canada

[21] Appl. No.: 288,628

[22] Filed: Jul. 30, 1981

[51] Int. Cl.³ .................. A22C 25/12; B65G 47/24
[52] U.S. Cl. .......................................... 17/64; 17/24; 198/383; 198/399
[58] Field of Search ............... 17/64, 24, 45; 198/382, 198/383, 398, 399

[56] References Cited

U.S. PATENT DOCUMENTS

| | | | |
|---|---|---|---|
| 1,373,812 | 4/1921 | Heath | 198/382 X |
| 1,893,903 | 1/1933 | Mullins | 198/382 X |

FOREIGN PATENT DOCUMENTS

| | | | |
|---|---|---|---|
| 656421 | 11/1964 | Belgium | 198/382 |
| 704428 | 2/1965 | Canada | 198/399 |

*Primary Examiner*—Willie G. Abercrombie
*Attorney, Agent, or Firm*—Cullen, Sloman, Cantor, Grauer, Scott & Rutherford

[57] ABSTRACT

An automatic fish feeder and orientor has a framework with top rails upon which are pivotally mounted spaced pairs of supports. A reciprocal feed table overlies and is pivotally mounted on the supports. A reciprocal feed plate is spaced below the table and is pivotally connected to the lower ends of the supports. A fish receiver is mounted upon the table and terminates at one end in a fish outlet. A fish delivery channel is mounted along the feed plate. A chute at one end communicates with the receiver outlet and at its other end, communicates with the delivery channel. Gill engaging supports are mounted within the receiver and channel for intermittently feeding the fish head first in one direction, through the outlet and chute and along the delivery channel. A power drive reciprocates the feed plate and connected table, moving them in opposite directions.

23 Claims, 10 Drawing Figures

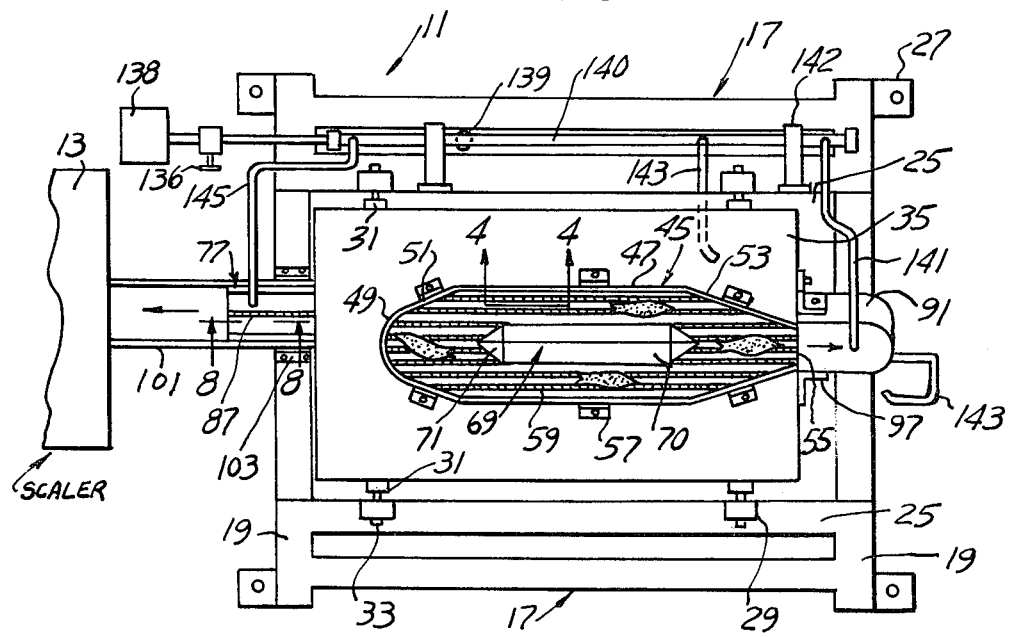
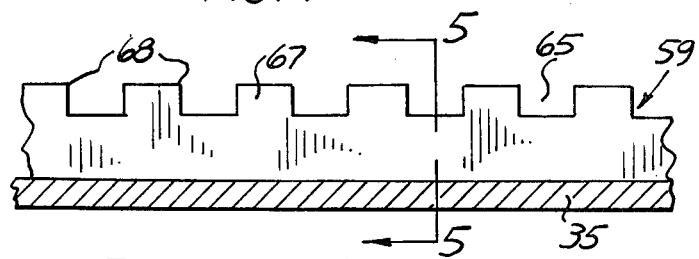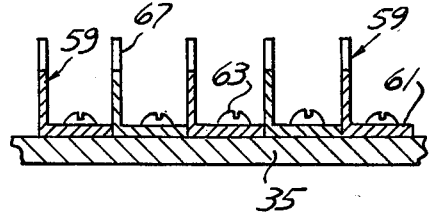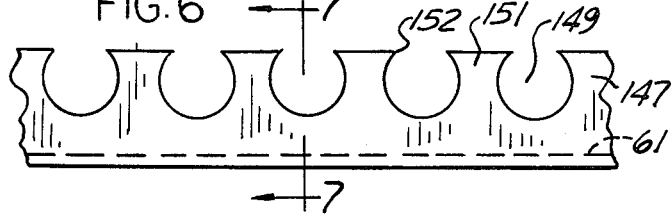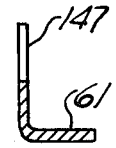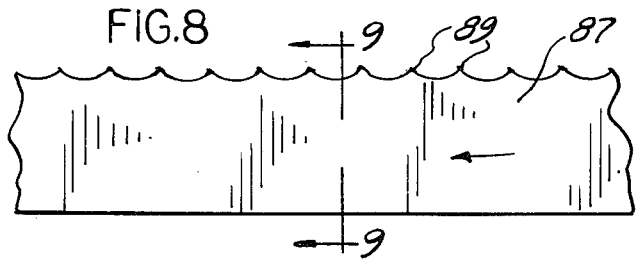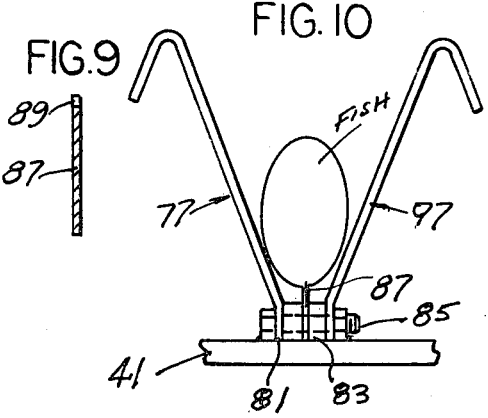

AUTOMATIC FISH FEEDER AND ORIENTATOR

BACKGROUND OF THE INVENTION

The present automatic orientator feeder system is designed to be used in conjunction with 1 to 4 high speed fish scaling machines, such as shown in A. Simard U.S. Pat. No. 3,787,727, dated Jan. 29, 1974. Individual scalers of this type normally require 1 operator for each unit to feed fish head first into the machine. When it is understood that the automatic scaler is capable of receiving and handling 16,000 to 32,000 pieces of fish per hour, there is understood the significant human problem of manually feeding the fish head first into the fish scaler. This is a difficult and time consuming operation requiring multiple manpower at times.

SUMMARY OF THE INVENTION

The present invention directed to an orientor feeder system, namely an automatic fish feeder and orientator adapted to automatically feed fish, head first into up to four scalers adapted for tripling production of the standard hand fed operation, requiring a single operator for the whole system.

An important feature of the present invention is to provide a automatic fish feeder and orientator which is adapted to receive large quantities of fish supplied by a conveyor from storage and delivered to the receiver mounted upon a longitudinally reciprocal feed table wherein gill engaging support means are mounted upon the table within the receiver so that on intermittant longitudinal movements of the feed table in one direction, the fish are longitudinally advanced within the receiver head first to the end thereof and out through the receiver outlet. As to those additional fish within the receiver which are in alignment therewith, but which face in the opposite direction on continued reciprocal movements of the receiver the arcuate formation of the receiver at its opposite end is effective to rotate and re-oriente those fish. They will ultimately be facing in the opposite direction for longitudinal feeding through the outlet.

Underlying the feed table is the reciprocal feed plate which also is adapted for continuous reciprocatibns in directions opposite to the movement of the overlying feed table. Mounted upon the reciprocal feed plate is an elongated fish delivery channel, also having in the bottom thereof, gill engaging support members so that movement in one direction of the feed plate will longitudinally advance the fish head first along the length of the channel outwardly thereof. A tunnel chute is connected to and suspended from the feed table, at its upper end is in communication with the receiver outlet and its lower end communicates with the feed channel.

It is the continued reciprocations of the feed table and feed plate in conjunction with the gill engaging support means within the respective receiver and channel which upon longitudinal movement in one direction thereof, causes continuous feeding in line of the fish head first and outwardly of the fish delivery channel adapted for projection into an automatic fish scaler.

The functioning of the feeder and orientator is augmented by a continuous supply of water into the fish receiver, into the chute and into opposite ends of the delivery channel.

A further feature of the present invention involves such pivotal supporting and mounting of the feed table and feed plate so that these members are adapted for continuous longitudinal reciprocation with the table and plate moving in opposite directions simultaneously so that such a continuous reciprocal movement in conjunction with the gill engaging members, in the receiver and within the feed channel have the effect of longitudinally advancing the fish head first in a line outwardly of the feeder adapted for projection into an automatic fish scaler.

These and other objects can be seen from the following specification and claims in conjunction with the appended drawings.

THE DRAWINGS

FIG. 3 is a plan view thereof with a portion of the automatic fish scaler fragmentarily shown.

FIG. 4 is a fragmentary section on an enlarged scale taken in the direction of arrows 4—4 of FIG. 3 showing one form of gill engaging support within the receiver.

FIG. 5 is a fragmentary section taken in the direction of arrows 5—5 of FIG. 4.

FIG. 6 is a fragmentary side elevational view of a modified gill engaging support means for the receiver.

FIG. 7 is a fragmentary section taken in the direction of arrows 7—7 of FIG. 6.

FIG. 8 is a fragmentary side elevational view of a portion of the gill engaging support within the reciprocating fish delivery channel.

FIG. 9 is a section taken in the direction of arrows 9—9 of FIG. 8.

FIG. 10 is a fragmentary elevational view on a enlarged scale illustrating one form of fish delivery channel upon the reciprocal feed plate.

It will be understood that the above drawings illustrate merely one embodiment of the invention, and that other embodiments are contemplated within the scope of the claims hereafter set forth.

DETAILED DESCRIPTION OF ONE EMBODIMENT OF THE INVENTION

Figure 1:
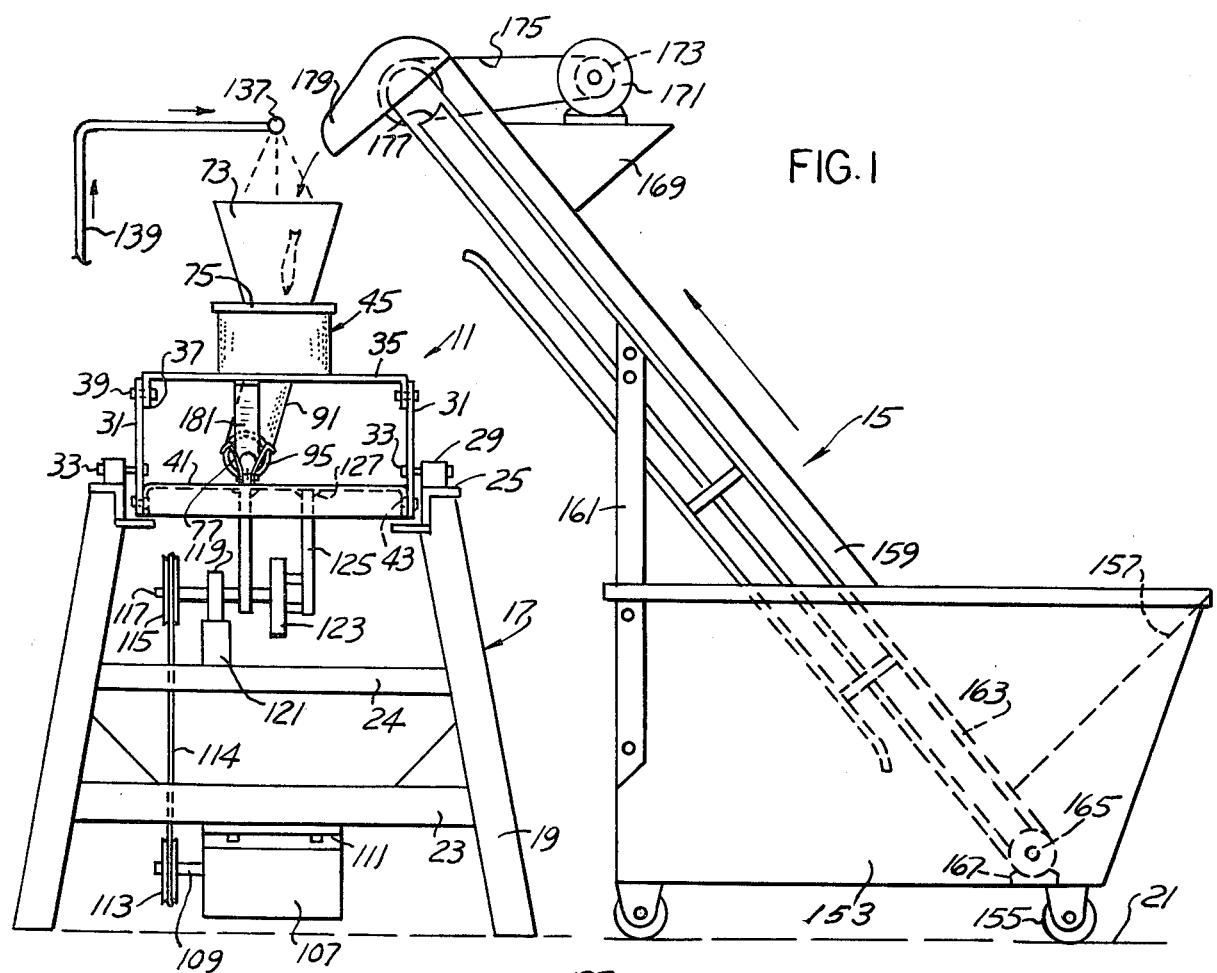
FIG. 1 is a fragmentary end elevational view of the fish feeder and orientator, upon a floor surface adjacent to which is an automatic fish conveyor continuously delivering fish into the feeder and orientator.
Figure 2:
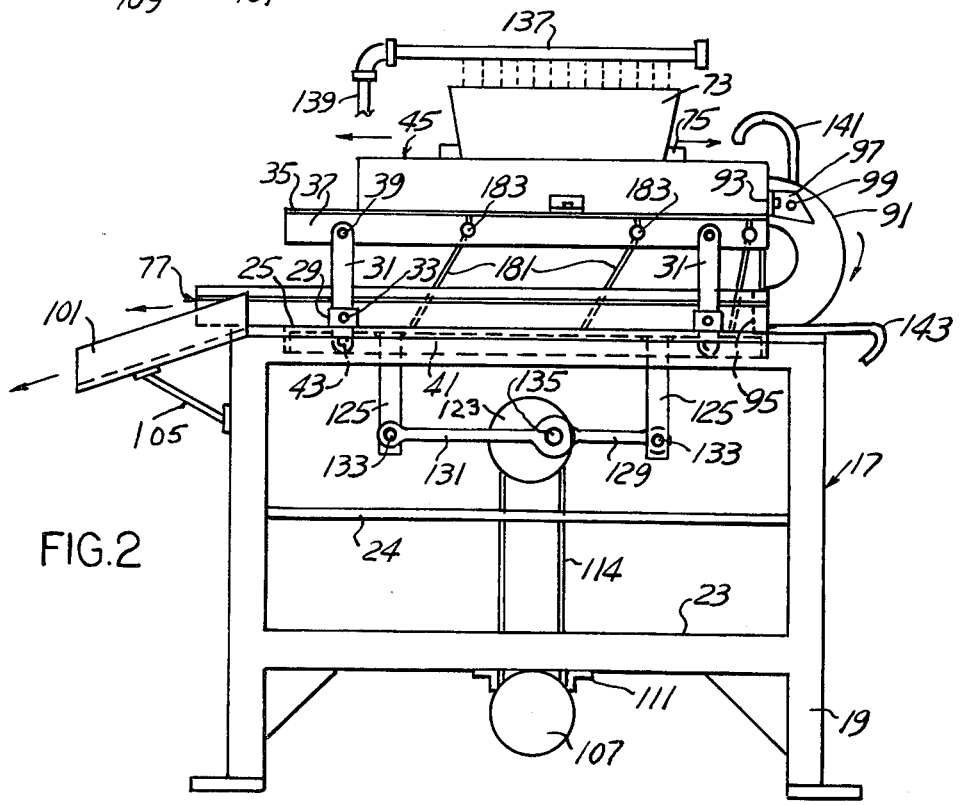
FIG. 2 is a fragmentary right side elevational view of the fish feeder of FIG. 1.

The present automatic fish feeder and orientator is generally indicated at 11, FIGS. 1, 2 and 3 adapted for delivering in a continuous manner head first a continuous supply of fish into a power operated automatic fish scaler, fragmentarily shown at 13. This scaler forms no part of the present invention and is set forth in A. Simard U.S. Pat. No. 3,787,927.

Associated with the automatic fish feeder 11 upon the floor 21 is a power operated conveyor assembly 15 adapted for delivering large quantities of fish in a continuous manner into the top of the fish feeder.

The present fish scaler includes a framework 17 having legs 19 secured upon the floor 21 as by the apertured anchor flanges 27, FIG. 3 and including a pair of laterally spaced top rails 25. The framework is further completed by reinforcing cross members 23 and 24, FIGS. 1 and 2.

Mounted upon said rails respectively are the spaced pairs of longitudinally spaced bearing blocks 29. Opposed longitudinally spaced pairs of substantially upright support arms 31 are pivotally mounted intermediate their ends on pivot pins 33 upon the respective bearing blocks 29. The elongated horizontally disposed reciprocal feed table 35 overlies framework 17 and along its opposite side flanges 37 is pivotally connected as at 39 and supported upon the upper ends of said support arms.

A horizontally disposed reciprocal feed plate 41 is interposed between the lower ends of the support arms 31 and pivotally connected thereto respectively as by the pivot pins 43.

Elongated fish receiver or box 45 having substantially continuous upright side walls 47, the arcuate end wall 49 and tapered walls 51, includes at its opposite end the converging walls 53 which terminate in the throated fish outlet 55 adjacent one end of the reciprocal feed table 35.

Said fish receiver is open at its top and bottom and is centrally mounted upon and secured to the feed table 35 longitudinally thereof. A plurality of anchor brackets 57 connect side wall portions of the receiver to the top surface of said feed table.

Mounted and secured upon said table and upon the interior of a fish receiver are a plurality of gill engaging means or supports 59 in the form of elongated support blades as shown in FIGS. 4 and 5. In one illustrative embodiment, the respective elongated support plates 59 terminate along their lower edge in the right angular anchor flanges 61 and are suitably secured to feed table 35 by a plurality of fasteners 63. In each of the supports 59, are a series of longitudinally spaced upwardly opening notches 65 of rectangular shape. These notches define a plurality of longitudinally spaced feed projections 67 having sharp corners thereon as at 68. These projections are adapted to operatively engage portions of the fish gills depending upon the direction of reciprocal movement of the feed table 35 and depending upon the extent of orientation of the fish within the receiver either head first to the right as shown in FIG. 3, or with the head facing the opposite direction.

Centrally disposed upon the feed table and within the elongated receiver 45 intermediate its ends is an elongated deflector 69 with downwardly and outwardly tapered side walls 70, FIG. 3, and downwardly and outwardly tapered end walls 71.

The primary purpose of the deflector is to function in conjunction with the opposed longitudinally extending side walls 47 of the receiver so that the fish as dropped thereinto will at least be longitudinally alligned therewith with some of the fish having their heads extending forwardly as shown and with some of the fish having their heads extended in the opposite direction.

Chute hopper 73 transversely overlies receiver 45 intermediate its ends in substantial vertical registery with deflector 69 and is suitably secured to the receiver as by the cross supports 75.

In normal operation, a continuous supply of fish delivered from the conveyor 15 is directed to the conveyor feed chute 179 normally into the open ended hopper 73. Under some conditions, this hopper may be omitted and the fish fed downwardly directly into the receiver.

The elongated fish delivery channel 77, may be of U-shape if desired, but in the illustrative embodiment, is shown substantially V-shaped in cross section, FIGS. 1 and 10. Said delivery channel includes a pair of downwardly and inwardly tapered side walls 79 terminating in the opposed parallel spaced anchor flanges 81 overlying feed plate 41 longitudinally thereof. A pair of elongated bosses 83 of substantially rectangular shape are spaced apart and extend longitudinally of the feed plate and are suitably secured thereto. The respective anchor flanges 81 bear against said bosses along the length thereof and are secured thereto by the transverse fasteners 85. These extend through the anchor flanges, through the bosses through corresponding apertures in the thin engaging feed blade or support 87 which is snugly interposed between and along the length of the bosses 83.

The present feed blade 87, shown on an enlarged scale in FIGS. 8 and 9 is sometimes referred to as the gill engaging means which is mounted within the fish delivery channel 77 for the purpose of supportably engaging fish fed longitudinally head first therein in a line.

The gill engaging means of feed blade or support 87 includes forwardly extending sharp angular projections 89 which are adapted for operatively engaging the respective gills of the fish longitudinally advancing the fish successively and in a line as the feed table is reciprocated particularly during that period when the feed table is moved in the direction of the projections 89.

Tubular feed chute 91 of a general arcuate form in the nature of a tunnel, has an inlet 93, FIG. 2 which is in communication with the receiver outlet 55, and is supported and secured upon the feed table by the mount brackets 97 and fasteners 99.

Said feed chute has an outlet 95 at its lower end which extends into one end of the delivery channel or track 77 inwardly thereof and is adapted for delivering fish head first from the receiver through said chute and into said fish delivery channel.

The opposite end of said fish delivery channel projects outwardly of one end of the reciprocal feed plate 41 and is adapted to deliver fish head first, one at a time onto the delivery ramp 101, shown in FIG. 2, which is generally of U-shape. Said delivery chute is secured to a portion of the framework as by the braket 103, FIG. 3 and is further reinforced and supported by the angular bracket 105, FIG. 2. The delivery chute 101 is adapted for delivering fish successively and head first into the front opening of the automatic fish scaler fragmentarily shown at 13 in FIG. 3.

The present automatic fish feeder and orientator includes a power means on the framework, which is connected to and is adapted to horizontally reciprocate the feed plate 41. In the illustrative embodiment, the power means includes an electric motor 107, preferably one-half horsepower, for illustration having a drive shaft 109, and secured to cross member or platform 23 of the framework by brackets 111. Said shaft has keyed thereto the pulley 113, which is connected to driven shaft 117 by the pulley belt 114 and pulley 115.

Driven shaft 117 is supported and journalled by the bearing 119 on bearing block 121 mounted upon cross member 24 forming a part of framework 17. The power means for effecting reciprocal movement of the feed plate 41 further includes disc 123. Longitudinally spaced opposed pairs of upright supports 125 depend from undersurface portions of said feed plate and are suitably secured thereto at 127, FIG. 1 and are arranged outwardly of said disc such as shown in FIG. 2.

A pair of crank arms 129 and 131 are eccentrically connected to disc 123 by the pivot pin 135, FIG. 2, and at their outer ends are pivotally connected to the respective uprights 125 by the pivot pins 133. Accordingly, continuous rotation of the disc 123 and the eccentrically connected crank arms 129 and 131 is adapted to effect longitudinal continuous reciprocal movements of feed plate 41.

In the operation of the present fish feeder and orientator, continuous flow of water is beneficial and helpful in the operation thereof due to the characteristic of fish scales providing a means for further lubricating the adjacent areas of the fish feeder to facilitate a continuous delivery of the fish head first outwardly thereof.

For this purpose, there is provided upon one side of and along the framework an elongated water header pipe 140 secured to the framework by brackets 142. Said pipe is connected to a source of water under pressure as at 138, FIG. 3, and includes a hand valve 136. A branch pipe 139 is connected to water header 140 and terminates at one end in the elongated water pipe 137, FIGS. 1 and 2 having a series of longitudinally spaced apertures in the undersurface thereof for delivering a continuous spray of water down into the chute 73 and into the receiver 45. Flexible conduit 141 is connected to said header pipe at one end and is connected at its opposite end to an upper portion of chute 91. An additional conduit 143, fragmentarily shown in FIG. 2, is connected to the water header pipe and extends into one end of the delivery channel 77. An additional flexible conduit 145 at one end is connected to said water header pipe and at its other end projects into the other end of the delivery channel shown in FIG. 3.

In connection with the above described gill engaging means 59, a modified fish support blade is fragmentarily shown at 147 in FIGS. 6 and 7 having a similar mounting flange 61 for securing to the feed table. Said blade has a series of longitudinally spaced upwardly opening circular notches 149 defining therebetween a series of longitudinally spaced feed projections 151 with corresponding sharpened corners adapted for operative engagement with the fish gills. Said corners are shown at 152.

The conveyor assembly schematically shown at 15, in FIG. 1 is particularly useful in conjunction with the present automatic fish feeder and orientor since it provides a continuous supply of fish into the receiver 45. Said conveyor includes a cart 153 on casters 155 movable upon the floor 21 and a V-shaped storage hopper 157 adapted to store between 300 and 500 pounds of fresh fish. The conveyor includes an elongated channel 159, which is inclined angularly upward and outwardly and is secured in position by the bracket 161. The lower end of the conveyor assembly is secured upon the interior of the cart by anchor 167.

A continuously movable conveyor belt 163 is journalled within the conveyor channel at its lower end as at 165. An electric motor, 171 for example a one horsepower motor, is mounted upon bracket 169 at the upper end of channel 159 and is adapted to rotate the pulley 173, which through belt 175 operates the drive wheel or cylinder 177 around which the conveyor belt extends.

The upper end of the conveyor terminates in a downwardly inclined feed chute 179 adapted for delivering fish down into the hopper 73 and into the fish receiver 45, FIG. 1.

As shown in FIG. 2 there are a plurality of downwardly extending control gates 181 which are longitudinally spaced and at their upper ends are pivotally mounted as at 183 upon feed table 35. These gates are for the purpose of controlling longitudinal feed movements of the fish successively in a line along the length of the fish delivery channel.

OPERATION

As fish are dropped continuously by the conveyor 15 through the hopper 73 and into the receiver 45, these fish impinge upon the deflector 69 and accumulate in the receiver extending in longitudinal directions with the heads facing one end or the other after the receiver such as shown in FIG. 3.

Under the operation of the motor 107, the eccentric disc 123 and through the cranks 129–131, the feedplate 41 will reciprocate continuously. The feed plate along its opposite sides is pivotally suspended from the upright support arms 31. The respective support arms are pivotally mounted as by the pivot pins 33 upon the top rails 25 of framework 17. Reciprocal feed table 35 is pivotally mounted as at 39 upon the upper ends of the support arms 31.

Accordingly, power controlled reciprocal movements of the feed plate 41 effect corresponding reciprocal movements of the feed table 35 with the feed table always moving in a direction opposite to the direction of the feed plate.

The fish receiver 45 being mounted upon feed table 35 reciprocates therewith and upon its bottom are the series of gill engaging means described specifically as the plurality of extending rows of notched support blades 59.

The fish within the receiver, as deflected by deflector 69 extend substantially longitudinally of the receiver and are generally parallel to the sidewalls 47 thereof. The heads thereof are either extending forwardly towards the outlet 55 of the receiver, or extending in the opposite direction facing the rounded end wall 49 of said receiver.

As the gill engaging means 59,67 move in one direction such as to the right, the gill engaging means as shown in FIG. 3 are adapted to gradually intermittently advance the fish within the receiver whose heads are facing towards the outlet 55. The gill engaging means or support blades 59 and their projections 67 operatively engage against the gills of the fish whose heads are facing towards the outlet 55. Accordingly, intermittent reciprocal movements and particularly the movements of the feed table 35 to the right, operatively engage the respective fish whose heads are facing in that direction to move them towards the converging walls 53, through the outlet 55 and into the chute 91.

With respect to the fish within the receiver, FIG. 3 which are faced in the opposite direction, the forward movement to the right of the gill engaging means 59 is ineffective for advancing those fish towards the outlet since they do not operatively engage those fish gills. However, on the return movement of the receiver in the opposite direction, the gill engaging means or blades 59 operatively engage the gills of those fish which are facing the left, projecting them against the curved surface 49 of the receiver at the opposite end thereof camming or otherwise eventually orienting those fish so that their heads face in the opposite direction, namely towards the direction of the receiver outlet 55. When the fish had been so reoriented within the receiver, movements of the receiver to the right at least gradually advance those fish along the bottom of the receiver on one side or the other of the deflector 69 until they reach the tapered walls 53 and eventually are moved through the outlet 55.

The fish progress downwardly through the chute by gravity and aided by the flow of water thereinto such as shown at 141, FIG. 2 are moved through the outlet 95 of the chute which loosely projects into the adjacent end of the fish delivery channel or track 77.

Along the length of said track are gill engaging means such as the notched feed blade 87 shown in FIGS. 8, 9 and 10, or there may be a plurality of parallel notch blades upon which the fish rest as they enter and move along the fish delivery channel 77 due to the reciprocating motion of said channel and its underlying supporting feed plate.

It is the retracting movement of the feed plate moving to the left as viewed in FIG. 2 wherein the projections or teeth 89 of the support blade 87 or blades are in operative engagement with the respective gills of the fish so as to advance the fish longitudinally and in a line along the length of the fish delivery channel 77.

Again, movement of the fish is facilitated by the application of water as through the conduit 143, FIG. 2 directed into the end of the channel 77 adjacent the chute 91.

While the channel is reciprocating, its return movements to the left as in FIG. 3 effect the intermittent longitudinal movements of the fish all head first in a line towards the outlet end of the fish delivery channel as in FIG. 2. Here the fish further assisted by water from the conduit 145 move downwardly along the delivery chute 101 and are advanced into the power operated automatic fish scaler 13 shown fragmentarily in FIG. 3.

The full construction of the fish scaler 13 is set forth in the A. Simard U.S. Pat. No. 3,787,927 dated Jan. 29, 1974. This machine includes feed mechanisms for advancing the fish head first longitudinally of the fish scaler automatically removing the scales therefrom in a continuous fashion.

Further water is delivered onto the top of the fish receiver 45 as through the chute 73, from the water feed pipe 137, FIG. 2.

The present automatic fish feeder and orienter obviates the earlier hand feeding of thousands of fish head first and projecting them into the automatic fish scaler 13.

The approximate output of the orientor feeder system is from 16,000 to 32,000 pieces per hour depending upon the number of scaler units employed in conjunction with the present fish feeder and depending upon the species and size of the fish handled.

The present feeder orientor system can handle fish in the range from four ounces to two pounds from two and one-half pounds to five pounds depending upon the size of the feeder employed.

The orientor feeder above described is constructed entirely of such corrosion resistant materials as stainless steel, aluminum and plastic.

In the illustrative embodiment, the present feeder and orientor is shown as used in conjunction with a single fish scaler. It is contemplated that the present feeder can be modified so that fish scalers could be arranged upon opposite ends of the fish feeder.

In that type of construction, it is contemplated that opposite ends of the fish receiver would be tapered and terminate in fish outlets leading to depending chutes whose lower ends communicate respectively with one of a pair of oppositely directed and oppositely extending feed tracks so that the fish would be feeding outwardly from the fish feeder in opposite directions directed to fish scalers upon opposite sides of the fish feeder.

It would be understood that in the event that a receiver is used which has outlets at its opposite ends, the gill engaging means which reciprocate with the feed table and the associated fish receiver, cause those fish which heads are facing to the right to move through the outlet 55 at one end of the receiver 45, and as to those fish whose heads are facing the opposite direction, the return movement of the gill engaging means would cause those fish to move through an outlet at the opposite end of the receiver through a second chute corresponding to the chute 91, FIG. 3.

Instead of one channel track or fish delivery track upon the feed table thereunder, there would be two such channel tracks respectively with a communication with the chutes 91 from opposite ends of the feed table. Thus, the fish would move downwardly at opposite ends and through their respective two outlets at opposite ends of the receiver. Thus, the second channel track would project in a direction opposite from the one shown in FIG. 3 so as to deliver fish continuously to a second scaler not shown.

Referring particularly to FIGS. 1, the pivotal connections 43 between the upright support arms 31 are closer to the arm pivots 33 than the pivotal connections 39 with respect to the pivots 33. This means that the longer arm portions above the pivot pins 33 will affect longer reciprocal movements of the feed table 35 as compared to the underlying feed plate 41 and the connected fish delivery channel 77.

This is desirable because the receiver 45 upon the the feed table performs two functions, i.e., to affect longitudinal movements successively of those fish which are faced to the right in FIG. 3 and at the same time, does the reorienting function so that those fish facing the opposite direction as shown in the drawing impinge upon the curved surface 49 and are eventually reoriented so as to face in the opposite direction. Thus, it is beneficial in the operation of the present fish feeder that the feed table reciprocate over a longer path than the feed plate thereunder. The only other function ascribed to the feed plate below is effecting longitudinal advancing movement of a single line of fish on the respective return movement or movement to the left of fish delivery channel mounted upon the feed plate.

Having described my invention, reference should now be had to the following claims.

I claim:

1. An automatic fish feeder and orientator adapted for continuously delivering fish into an automatic fish scaler comprising a framework mountable upon a floor and including a pair of laterally spaced top rails;

opposed longitudinally spaced pairs of substantially upright support arms intermediate their ends pivotally mounted upon said rails respectively;

an elongated reciprocal feed table overlying said framework and along opposite sides pivotally connected to and supported upon the upper ends of said support arms, respectively;

a horizontally disposed reciprocal feed plate overlying said framework spaced below said table and along its opposite sides pivotally connected to the lower ends of said support arms, respectively;

an elongated fish receiver having an upright side walls with an open top and bottom centrally mounted upon and secured to said table longitudinally thereof, said side walls terminating in a throated converging fish outlet adjacent one end of said table;

an elongated fish delivery channel mounted upon and secured to said feed plate along its length underlying said receiver and projecting outwardly of the end of said feed plate opposite from said receiver outlet;

a tubular feed chute of arcuate shape supported upon said table at one end communicating with said receiver outlet, with its other end loosely projected into and communicating with said delivery channel;

power means on said framework connected to and horizontally reciprocating said feed plate;

and gill engaging means mounted upon said table within said receiver and mounted within and along said delivery channel for supporting and intermittently feeding the fish head first in one direction longitudinally of said receiver through said outlet and into said chute and intermittently feeding the fish head first in the opposite direction from said chute and longitudinally of and along said delivery channel and outwardly of one end thereof.

2. In the fish feeder of claim 1, said receiver adapted to continuously receive fish of random orientation, said delivery channel being adapted to continuously deliver fish in a line oriented head first.

3. In the fish feeder of claim 1, an open-ended downwardly converging hopper chute overlying and mounted upon said receiver intermediate its ends for receiving and delivering fish into said receiver.

4. In the fish feeder of claim 1, said feed plate reciprocally tilting said support arms simultaneously, said support arms effecting reciprocal movements of said feed table, said feed table and feed plate simultaneously moving in opposite directions.

5. In the fish feeder of claim 1, opposed longitudinally spaced pairs of bearing blocks mounted upon said rails, said support arms being pivotally mounted upon said blocks respectively.

6. In the fish feeder of claim 1, the pivotal connection of said support arms to said rails being closer to said feed plate than said feed table whereby the feed table moves longitudinally a greater distance proportionally than said feed plate and connected delivery channel.

7. In the fish feeder of claim 1, the side walls of said receiver being rounded at one end opposite from said outlet, said gill engaging means on movement of said feed table in one direction slipping under the fish facing said rounded end, said gill engaging means on retracting movement gradually moving said fish into engagement with said receiver rounded end, camming and orienting said fish to face the opposite direction.

8. In the fish feeder of claim 1, an elongated deflector body mounted upon said feed table longitudinally and centrally of said receiver intermediate its ends, having a pair of downwardly diverging top walls along its length and downwardly diverging end walls, for aligning the fish longitudinally of the sides of said receiver.

9. In the fish feeder of claim 8, an open-ended downwardly converging hopper chute overlying and mounted upon said receiver intermediate its ends for receiving and delivering fish into said receiver, said deflector body underlying said hopper chute.

10. In the fish feeder of claim 1, said fish delivery channel being substantially V-shape in cross-section.

11. In the fish feeder of claim 1, a series of longitudinally spaced control gates pivotally suspended from said feed table loosely and yieldably extending into said channel.

12. In the fish feeder of claim 1, said power means including a power rotated shaft journaled upon said framework transversely thereof; a disk on one end of said shaft; a pair of longitudinally spaced uprights secured to and depending from said feed plate upon opposite sides of said disk; and a pair of crank arms at their inner ends pivotally connected eccentrically to said disk and at their outer ends pivotally connected to said uprights respectively, rotation of said disk effecting continuous reciprocal movements of said feed plate.

13. In the fish feeder of claim 12, said power means further including a motor mounted upon said framework having a drive shaft parallel to said power rotated shaft; and pulleys on said drive shaft and power rotated shaft interconnected by a belt.

14. In the fish feeder of claim 1, said gill engaging means including a plurality of longitudinally extending parallel spaced rows of upwardly extending notched supports adapted to interlockingly engage the fish gills for advancing the fish head-first.

15. The fish feeder of claim 14, the notches in said supports being of upwardly opening rectangular form defining therebetween a series of longitudinally spaced sharp cornered projections.

16. In the fish feeder of claim 14, the notches in said supports being of upwardly opening circular form defining therebetween a series of longitudinally spaced sharp cornered projections.

17. In the fish feeder of claim 14, said supports having continuous right angular flanges at their lower edges engaging and secured to said feed table and feed channel respectively.

18. In the fish feeder of claim 1, said gill engaging means for said receiver including a plurality of longitudinally extending parallel spaced rows of upwardly extending notched fish supports secured to said feed table.

19. In the fish feeder of claim 1, said gill engaging means for said feed channel including at least one longitudinally extending upwardly notched support along the length of said channel having a series of spaced sharp projections extending in the direction of outward feed movement of said channel for engaging opposing fish gills, and intermittently advancing the fish respectively along said channel, return movement of said notched support being substantially free of said fish.

20. In the fish feeder of claim 10, said feed channel including a pair of of parallel spaced upright bosses secured to said feed plate, said gill engaging means for said feed channel including a longitudinally extending upwardly notched support along the length of said channel having a series of spaced sharp projections extending in the direction of outward feed movement of said channel for engaging the opposing fish gills and intermittently advancing the fish respectively along said channel; said support being nested between said bosses; the sidewalls of said channel at their lower ends terminating in parallel spaced depending flanges bearing against said bosses respectively; and a series of spaced fasteners extending through said flanges, bosses and notched support.

21. In the fish feeder of claim 1, an elongated water header pipe mounted upon said framework and connected to a source of water under pressure; and branch conduits connected to said header and extending over said receiver for spraying water thereinto, extending to the top of said feed chute, and extending into the respective ends of said feed channel assisting feeding of said fish.

22. In the fish feeder of claim 1, a channel ramp secured to said framework at one end loosely underlying the outlet of said feed channel in communication therewith, and inclined downwardly adapted for delivering fish successively and head-first into an automatic fish scaler.

23. In combination with the fish feeder of claim 1, a fish storage hopper, and an upwardly and forwardly inclined power operated conveyor at one end extending into said storage hopper, with its upper end projecting forwardly of said storage hopper and including a chute overlying said receiver for continuously delivering fish thereinto.

* * * * *